United States Patent [19]

Hale

[11] 4,032,926
[45] June 28, 1977

[54] DATA RECORDING INSTRUMENT

[76] Inventor: George Robert Hale, 2531 Marin Ave., Berkeley, Calif. 94708

[22] Filed: May 12, 1976

[21] Appl. No.: 685,939

[52] U.S. Cl. .................. 346/79; 346/113; 346/136

[51] Int. Cl.² ............... G01D 15/04; G01D 15/16; G01D 15/24

[58] Field of Search .................. 346/113, 79, 136

[56] References Cited

UNITED STATES PATENTS

| 1,964,409 | 6/1934 | Whittaker | 346/79 |
|---|---|---|---|
| 2,890,924 | 6/1959 | Norfolk, Jr. | 346/113 |
| 3,370,300 | 2/1968 | Gilorich et al. | 346/113 |

Primary Examiner—George H. Miller, Jr.
Attorney, Agent, or Firm—Bielen and Peterson

[57] ABSTRACT

A data recording instrument having a recording sheet supply roll and a recording sheet take-up roll used for continuously recording a sensor. The instrument utilizes an axially movable rod activated by pulsing means. Movement of the rod advances the take-up roll through lever means connected to the axially movable rod. The lever means adjusts the degree of turning of the take-up roll in proportion to the amount of recording sheet accumulated on the take-up roll. The axial movement of the rod also activates marking means for charting the resultant output of at least one continuous sensor.

10 Claims, 6 Drawing Figures

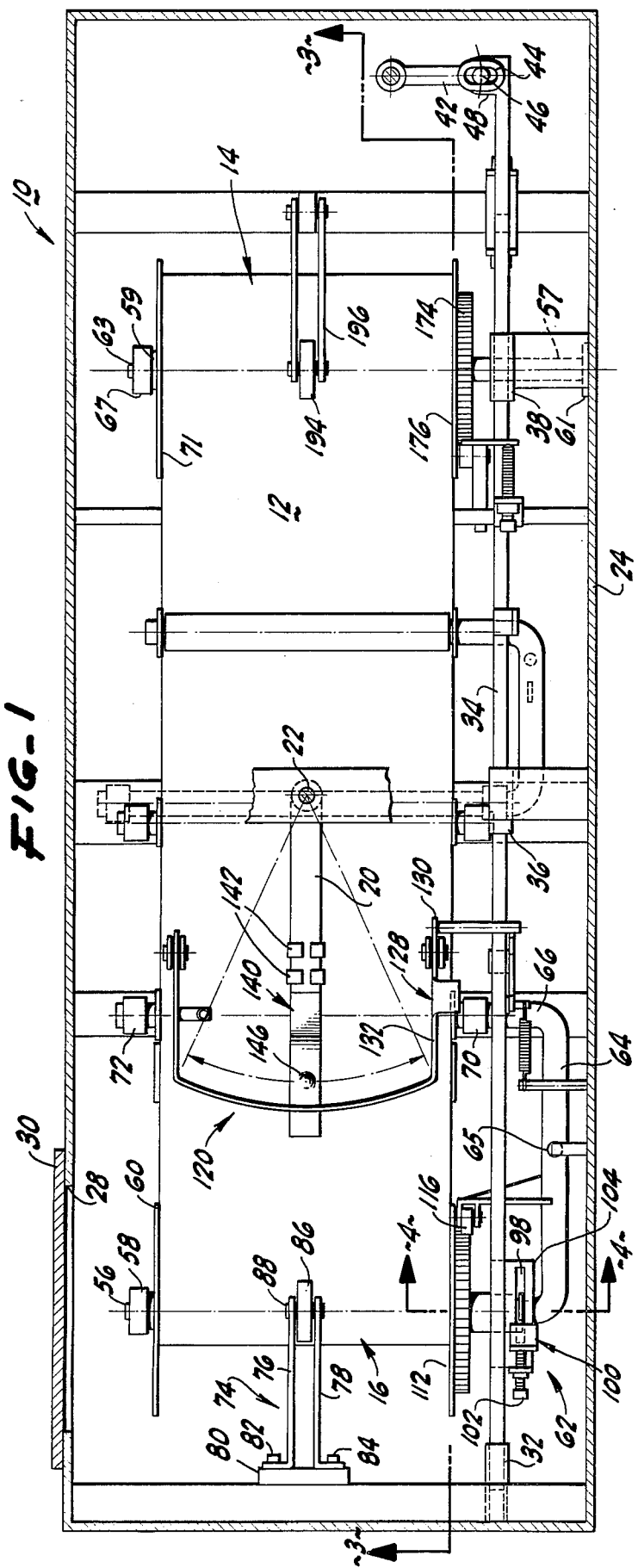
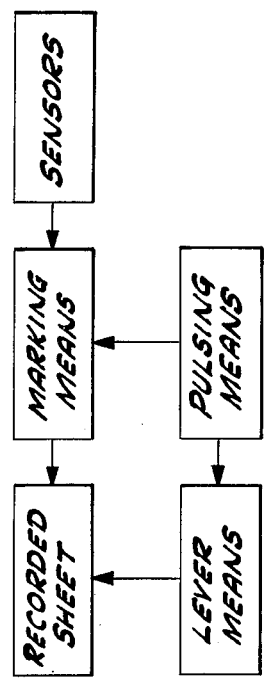
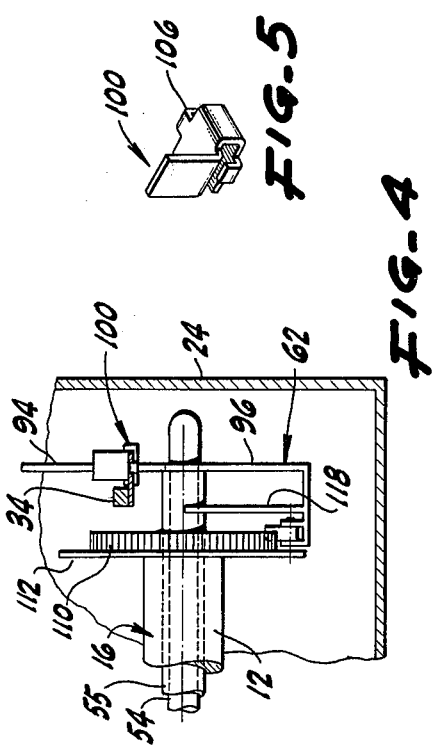

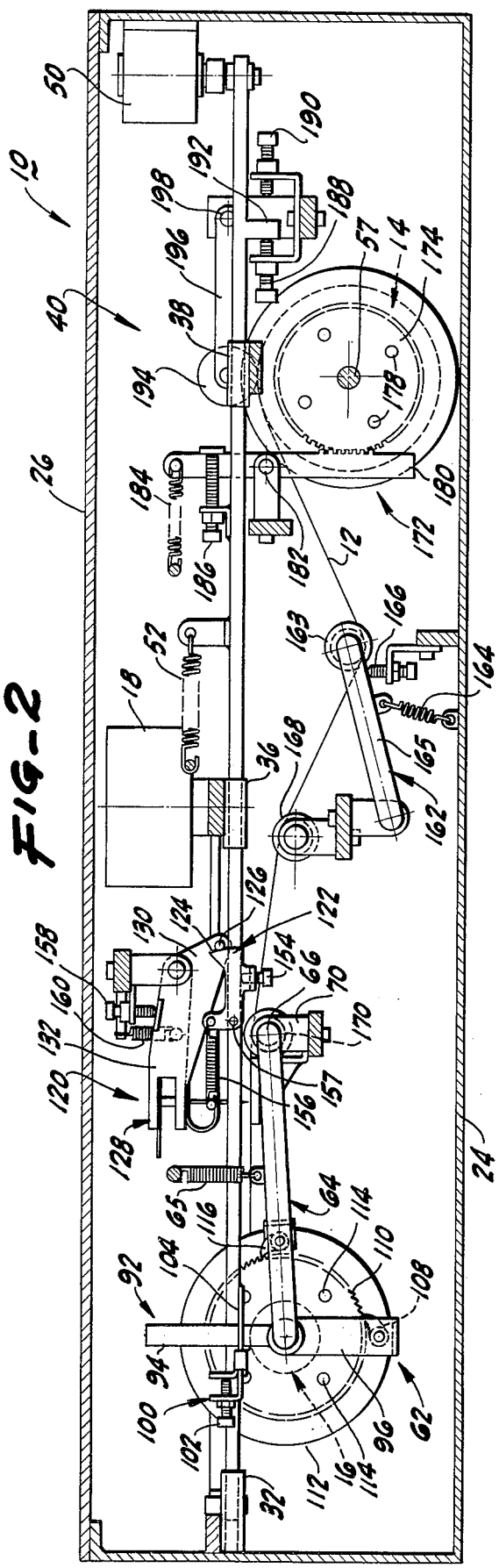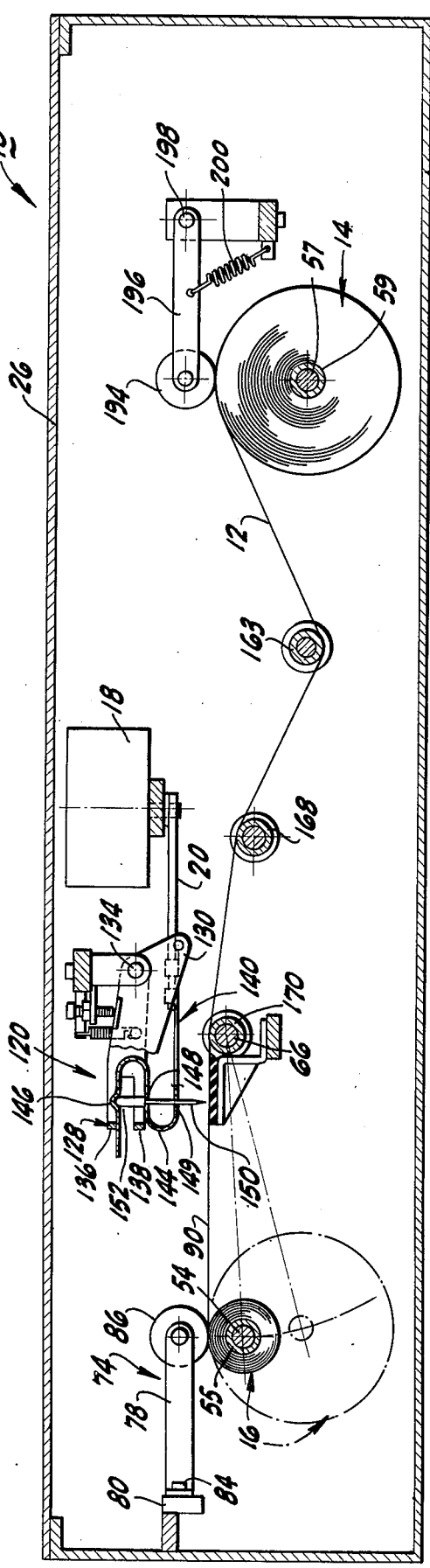

DATA RECORDING INSTRUMENT

BACKGROUND OF THE INVENTION

The present invention relates to a novel data recording instrument.

Continuous recording of measurable quantities has been determined to be very desirable for researching scientific problems. Moreover, reduction of such recordings into graphic formats has simplified the presentation of voluminous data to interested parties. For example, recording and charting of data has been used during lengthy manufacturing processes and during mass production of chemicals and hardware. Charting has been used while gathering weather and other geographical data as well.

Chart drive continuous recording instruments employing supply and take-up rolls of recording sheet material possess the problems of reliability and accuracy since they are often left unattended. Known types of chart recorders have ink pens that frequently fail to work for lack of ink or because of a clogged or broken nib. Many require a take-up reel slip clutch which absorbs excessive power.

Presently designed recorders run from motors or clocks which continuously drain a supply of energy. This characteristic severely limits the useful working period of such recorders in remote areas where a portable or finite energy supply is the motive requirement. Further complications arise from the need to vary the drive motor speed as the recording sheet accumulates on the take-up roll (thus increasing its circumference) to maintain constant chart intervals for the recordation of data. Mechanical spring loaded chart drive recorders run for relatively short time periods.

There is a need for a self contained, reliable, longlived, continuous data recording instrument using a recording sheet to graphically display the recorded data.

SUMMARY OF THE INVENTION

In accordance with the present invention a novel data recording instrument having a recording sheet supply roll and recording sheet take-up roll is provided.

The instrument utilizes a rod movable along its axis in either direction by pulsing means. Lever means connected to the axially movable rod turns the take-up roll upon axial movement of the rod. The lever means adjusts the degree or amount of turning of the take-up roll in proportion to the amount of the recording sheet accumulated on the take-up roll. Thus, a uniform length of the recording sheet moves onto the take-up roll with each pulse.

The instrument also has, as one of its elements, marking means for impressing the recording sheet with the resultant output of at least one continuous sensor. The marking means also connects to the activating rod to produce its impression upon the recording sheet.

The lever means may include a support arm whose first end portion pivotally attaches to a supporting surface and whose second end portion attaches to the take-up roll. Positioning means for maintaining the recording sheet about to accumulate on the take-up roller, holds the recording sheet at a fixed orientation. Thus, the marking means may easily make its impression on the recording sheet. The positioning means causes the second end portion of the support arm to pivot a predetermined amount in accordance with the amount of the recording sheet found on the take-up roll. The lever means may also be deemed to embrace a lever having its fulcrum on the axis of the take-up roll. One of the lever arms adapts to engage the axially movable rod while the other arm of the lever turns the take-up roll.

The instrument's pulsing means may be constructed to include a pulser which axially moves the rod in one direction and spring means to axially move the rod in another direction. The mechanism of the instrument may be articulated such that the pulser activates the marking means, and the spring means activates the lever means advancing the take-up roll.

Brake means may be included on the recording sheet supply roll for arresting the turning of the same during activation of the marking means. This feature prevents excessive advance of the recording sheet, especially where intense vibrations act upon the instrument.

More specifically the take-up roll may include a ratchet wheel circumjacently affixed to the axis of the take-up roll. The other arm of the lever includes a drive pawl engaging and turning the ratchet wheel. An idler pawl also engages the ratchet wheel to prevent turning of the take-up roll in one direction, i.e., where accumulation of the recording sheet does not take place.

The marking means may consist of cam means having a cam surface and a cam follower. Axial movement of the rod causes travel of the cam follower along the cam surface. A marker bar having a first portion and a second portion with a pivot therebetween is also included. The marking bar pivotally attaches to a supporting surface. The cam means attaches to the first portion of the marker bar and pivots the same during the cam follower's movement. Puncture means for penetrating the surface of the recording sheet engages the second portion of the marker bar. The puncture means positions above the recording sheet in accordance with the output of the sensor. Thus, axial movement of the rod activates the cam and marker bar resulting in puncture of the recording sheet.

The cam surface also allows for withdrawal of the puncture means from the recording sheet after penetration.

It can be deduced that the instrument described uses small amounts of energy and produces accurate data records in a continuous manner.

It is therefore an object of the present invention to provide a data recording instrument usable to graphically display the resultant output of one or more sensors of environmental characteristics.

It is another object of the present invention to provide a data recording instrument of the type having a sheet supply roll and recording sheet take-up roll in which the time intervals along the recording sheet are uniform to preclude the gathering distorted data.

It is yet another object of the present invention to provide a data recording instrument which possesses a high degree of reliability and requires a very low amount of power over a period of time resulting in the working of such an instrument for a relatively long time from a lightweight and inexpensive power storage unit and without the necessity of attendance thereto.

Another object of the present invention is to provide a data recording instrument which does not require reliance on inking markers.

Yet another object of the present invention is to provide a data recording instrument having a recording sheet that can withstand intense vibration and the elements.

Another object of the present invention is to provide a data recording instrument which does not require a continuous external supply of electrical power.

The invention possesses other objects and advantages especially as concerns particular features and characteristics thereof which will become apparent as the specification continues.

The invention and its embodiments may be better understood by reference to the drawings described below.

BRIEF DESCRIPTION OF THE DRAWINGS

FIG. 1 is partially broken top plan view of the invention.
FIG. 2 is a side elevational view of the invention.
FIG. 3 is a view taken along line 3—3 of FIG. 1.
FIG. 4 is a view taken along line 4—4 of FIG. 1.
FIG. 5 is a perspective view of the rod stroke adjustment means.
FIG. 6 is a schematic view of the invention.

DESCRIPTION OF THE PREFERRED EMBODIMENTS

The instrument as a whole is depicted by reference character 10 and includes as one of its elements a recording sheet 12 which generally originates on a supply roll 14 and travels to a take-up roll 16. The recording sheet 12 may be fabricated of any material capable of being rolled and unrolled as well as capable of receiving an impression thereupon, such as paper, plastics including mylar, parchment, cloth, and the like, FIGS. 1 and 2.

A sensor 18 mounts above the recording sheet. The resultant output of sensor 18 manifests in pointer arm 20 which moves accordingly above the surface of recording sheet 12, about pivot 22.

The instrument 10 includes a structural frame 24 which supports the elements of the invention as will heretofore be described. Frame 24 may also serve to protect the invention 10 from the elements by forming frame 24 into an enclosure having a lid 26 as well as an access opening 28 for easily reaching supply and take-up rolls 14 and 16. Plate 30 maintains the integrity of frame enclosure 24 as desired, FIGS. 1, 2 and 3.

Attached to frame 24 is a bushing 32 which accepts axially movable rod 34, of rigid construction. Rod 34 may move in either direction along its axis. Guides 36, and 38 attached to frame 24 stabilize such axial movement of rod 34. Pulsing means 40 imparts a turning movement to pivot arm 42. Slot 44 on an end of pivot arm 42 engages stud 46 on ear 48 of rod 34. Thus, the pivoting of arm 42 causes the axial movement of rod 34.

Pulsing means 40 for axially moving rod 34, may include a pulser 50 to swing arm 42 in one direction and spring means 52 to swing arm 42 in the opposite direction. Rod 34 moves in opposite axial directions with opposite swings of arm 42. Pulser 50 and spring means 52 affix to frame 24 in any conventional manner such as welding, bolting, and the like. For example, pulser 50 may be the mechanism used in the Shick Fresh Air Machine, manufactured by the Shick Safety Razor Co., Milford, Connecticut. In any case, the power supply to pulser 50 may be a simple set of "D" cell batteries. A continuous supply of energy is not required, although readily usable by the instrument 10.

The pulsations from the pulser 50 may be spaced at preselected intervals, for instance 15 minutes.

Take-up roll 16 has an axle 54 with a threaded end 56. Nut 58 retains flange 60 on axle 54, and is easily removable to replace the recording sheet 12 accumulated on the roll 16. Likewise, supply roll 14 has an axle 57 surrounded by a sleeve 59 which is freely movable with respect to axle 57, firmly affixed to frame 24 on end with flange 61. Threaded end 63 and nut 67 removably hold supply recording sheet 12 on roll 14 via flange 71. Sleeves 55 and 59 rotate about axles 54 and 57 with the accumulation and unrolling recording sheet 12 respectively. Axles 54 and 57 may be constructed of rod stock. The end of recording sheet 12 attached to sleeves 55 and 59 by any means such as clipping, wrapping, and other similar means.

The instrument 10 also includes lever means 62 for turning the take-up roll. Lever means 62 adjusts the degree of turning of the take-up roll 16 in proportion to the amount of the recording sheet accumulated thereupon. Axial movement of rod 34 along its axis results in engagement of lever means 62 and rod 34. Lever means 62 may include support arm 64 having a first end portion 66 and a second end portion 68. First end portion 66 passes through sleeves 70 and 72 attached to frame 24, and rotates on its axis. Second end portion 68 attaches to the take-up roll 16. FIG. 1 depicts such attachment at the axis of axle 54.

Positioning means 74 maintains the recording sheet 12, about to accumulate on the take-up roll 16 at substantially a fixed location. In its preferred embodiment, positioning means 74 includes a pair of "L" brackets 76 and 78 affixed to frame 24 at plate 80 with bolts 82 and 84. Wheel 86 on axle 88 rotatably attaches between the ends of L brackets 76 and 78. As shown in FIG. 3 accumulation of the recording sheet 12 on roll 16 causes pivoting of support arm 64 about the axis of its first end portion 66, as a result of the downward pressure of positioning means 74. Spring means 65 maintains contact of take-up roll 16 with positioning means 74. The recording sheet portion 90 remains at the same location during advancing of the recording sheet from supply roll 14 to take-up roll 16.

The second end portion 68 of the support arm 64 also includes a lever 92 having its fulcrum on the axis of the take-up roll 16. One arm 94 of lever 92 adapts to engage rod 34 during its axial movement while the other arm 96 adapts to turn the take-up roll 16. Slot 98 on rod 34 permits passage of arm 92. Pulsing means 40 forces engagement of the edge of slot 98 with arm 92. FIG. 5 illustrates an adjustment means 100 for predetermining the contact position of arm 92 within slot 98. Set screw 102 slides adjustment means 100 along bar 104 affixed to rod 34, to increase or decrease the size of slot 98. Arm 92 thus abuts end piece 106 of means 100. The length of arm 92 from axle 54 would vary as the thickness of the recording sheet accumulation on take-up roll 16.

As the take-up roll increases in diameter the constant pulse of pulsing means 40 would move rod 34 at a constant stroke. However, lever arm 94 would increase its length and lever arm 96 would proportionately turn take-up roll a lesser angular distance exactly compensating for the lesser angular distance of rotation required to keep advancement of sheet 90 at a constant increment.

The other arm 96 includes a drive pawl 108 which engages ratchet wheel 110, FIGS. 2 and 4. Ratchet wheel affixes to spool 112 on axle 54 via fastening means 114. Idler pawl 116 affixes to second end portion 68 of support arm 64 and prevents back-slip of axle 54 after the pivotal motion of the support arm 64. Bracing member 118 strengthens lever 92.

Marking means 120 impresses the resultant output of at least one continuous sensor on the recording sheet 12. Axial movement of rod 34 activates marking means 120, FIGS. 1, 2 and 3. As shown in the drawings marking means 120 includes cam means 122 having cam surface 124. Cam follower 126 travels along the cam surface 124 when rod 34 moves along its axis. A marker bar 128 has a first end portion 130 and a second end portion 132 which spans the fixedly located portion 90 of sheet 12. Marker bar 128 pivots on pin 134. Thus, the upward rotation of first end portion 130 effects the downward rotation of second end portion 132. The second end portion 132 is split into an upper bar 136 and a lower bar 138. Scribe unit 140 attaches to pointer arm 20 with a plurality of tabs 142. FIG. 3 illustrates scribe unit 140 which includes a flexible S shaped member 144, having a recess 146 at its upper portion and openings 148 and 149 through its intermediate and lower portions. Puncture means 150 having an enlarged portion 152 passes through openings 148 and 149. Enlarged portion 152 fits into recess 146 but does not pass through opening 148. Thus, member 144 holds puncture means 150 on scribe unit 140.

Upper bar 136 presses puncture means 150 into sheet portion 90 as a result of the movement of cam means 122. Lower bar 138 removes puncture means 150 from recording sheet 90 as a result of the force exerted by spring 160. Set screw 154 adjusts the height of cam surface 124 above rod 34. Spring 156 functions to position cam surface 124 about pivot 157 for the contact of cam surface 124 and cam follower 126. Cam surface 124 is cut to a radius such that the pressure of cam follower 126 rotates cam means 122 about pivot 157 to cause engagement of set screw 154 with rod 34 during the rise of cam follower 126. Pivot 157 allows cam follower 126 to remain level when rod 34 returns to its initial position. After marking marker bar portion 132 is set to permit scribe unit 140 to travel unhindered in a horizontal plane between bar portion 136 and 138 with the changes in sensor 18.

Recording sheet 12 is held taut by the action of roller means 162 having spring means 164 and set screw 166 to limit the scope of travel of roller 163 pivoting on member 165. The plane formed by roller 168 and roller 170 is offset from the horizontal plane by an angle of at least 5° to insure continual engagement of sheet 12 with roller 170.

Brake means 172 arrests the turning of recording sheet 12 from supply roll 14 during activation of marking means 120. As depicted in FIG. 2, the supply roll 14 has a gear wheel 174 attached to spool 176 via fastening means 178. Brake pawl 180 fixes to frame 24 on pivot 182. Spring means 184, attached to frame 24 and set screw 186 affixed to rod 34, act together to engage and disengage the pawl 180 from gear wheel 174.

Set screws 188 and 190 placed in opposite positions on frame 24 act on flange 192 of rod 34 to determine the stroke thereof. Friction wheel 194 on arm 196 pivots about pin 198 to exert a slight drag on sheet 12 leaving roll 14. Spring means 200 maintains frictional engagement of wheel 194 with supply roll 14.

FIG. 6 generally shows the interaction of the sensor 18 and pulsing means 40 to produce a recorded sheet via the marking means 120 and lever means 62.

In operation the user inserts recording sheet 12 from supply roll 14 under roller 163 over rollers 168 and 170 and into take-up roll 16.

Sensor 18 is attached to scribe unit 140 and pulsing means 40 is activated to pulse at a predetermined interval. Movement of rod 34 in one direction, to the right in the drawings backs up drive pawl 116 on the ratchet wheel 110. Cam means 122 acts such that the cam follower 126 rides on cam surface 124. Marker bar 128 pivots on pin 134 resulting in the lowering of puncture means 150 through sheet portion 90. Further movement of cam follower 126 on cam surface 124 over top dead center lifts the puncture means from the sheet 12. Spring 160 urges contact of cam follower 126 to cam surface 124 during this portion of the cam follower's travel. Specifically, puncture means 150 lowers and raises by engagement of the upper bar 136 and lower bar 138 on member 144. Marking means 140 is left free of any contact with end portion 132 and may swing freely in a horizontal plane.

Brake means 172 is set to release the supply roll 14 just after activation of the marking means 120. Roller means 162 unrolls sheet 12 from roll 14 by the downward rotation of member 165, which is limited by set screw 166. Friction wheel 194 prevents excessive release of sheet 12 from supply roll 14 at this time.

Spring means 52 initiates axial movement of rod 34 in the other direction. Brake means 172 arrests further movement of supply roll 14. Lever means 62 advances the recording sheet 12 through the movement of drive pawl 108 on ratchet wheel 110. FIG. 3 depicts, in phantom, the position of the rolls 14 and 16 after passage and marking of a substantial portion of sheet 12. It should be noted that the axle 54 of take-up roll 16 rotates downwardly beneath positioning means 74 as sheet 12 accumulate on roll 16.

The length of arm 94 of lever 92 engaging the end of piece 106 of adjustment means 100 in slot 98, has proportionately increased. Such increase proportionally decreases the angular turning of take-up roll 16, each time lever means activates. The proportionate decrease in the angular turning of take-up roll 16 is exactly the amount necessary to produce uniform increments of advancing sheet 12. It may be apparent that a novel data recording instrument has been described in its best mode.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. A data recording instrument having a recording sheet supply roll and recording sheet take-up roll for charting at least one continuous sensor comprising:
 a. rod movable along its axis in both directions,
 b. lever means for turning the take-up roll, said rod engaging said lever means thus turning the take-up roll during movement of said rod along its axis, said lever means adjusting the degree of turning of the take-up roll in proportion to the amount of the recording sheet accumulated on the take-up roll, c. marking means for impressing on the recording sheet the resultant output of at least one continuous sensor, said marking means connected to said rod and activated upon axial movement of said rod, d. pulsing means for axially moving said rod.

2. The data recording instrument of claim 1 in which said lever means comprises:

a. support arm having a first end portion and a second end portion, said first end portion pivotally attached to a supporting surface, said second end portion attached to said take-up roll, b. positioning means for maintaining the recording sheet, about to accumulate on the take-up roll, at substantially a fixed location, said positioning means causing predetermined pivoting of said second end portion of said support arm, c. lever having its fulcrum on the axis of the take-up roll, one arm of said lever adapted to engage said rod and said other arm of said lever adapted to turn the take-up roll.

3. The data recording instrument of claim 1 in which said pulsing means comprises:

a. pulser axially moving said rod in one direction, said movement of said rod in one direction activating said marking means, b. spring means axially moving said rod in the other direction, said movement of said rod in the other direction activating said lever means.

4. The data recording instrument of claim 3 which additionally comprises brake means for arresting the turning of the recording sheet supply roll during activation of said marking.

5. The data recording instrument of claim 4 in which the take-up roll includes a ratchet wheel circumjacently affixed to the axis of the take-up roll, said other arm of said lever including a drive pawl engaging said ratchet wheel, and an idler pawl engaging said ratchet wheel to prevent turning of the take-up roll in one direction.

6. The data recording instrument of claim 1 in which said marking means comprises:

a. cam means including a cam surface and a cam follower, said cam follower traveling along said cam surface with axial movement of said rod.

b. marker bar having a first portion and a second portion said first and second portion pivotally attached to a supporting surface said cam means attached to said first portion of said marker bar and pivoting said marker bar, c. puncture means for penetrating the surface of the recording sheet, said puncture means engaging said second portion of said marker bar, said puncture means positioned above the recording sheet in accordance with the output of the sensor.

7. The data recording instrument of claim 6 in which said lever means comprises:

a. support arm having a first end portion and a second end portion, said first end portion pivotally attached to a supporting surface, said second end portion attached to said take-up roll, b. positioning means for maintaining the recording sheet, about to accumulate on the take-up roll, at substantially a fixed location, said positioning of said second end portion of said support arm, c. lever having its fulcrum on the axis of the take-up roll, one arm of said lever adapted to engage said rod and said other arm of said lever adapted to turn the take-up roll.

8. The data recording instrument of claim 7 in which said pulsing means comprises:

a. pulser axially moving said rod in one direction said movement of said rod in one direction activating said marking means, b. spring means axially moving said rod in the other direction, said movement of said rod in the other direction activating said lever means.

9. The data recording instrument of claim 8 which additionally comprises brake means for arresting the turning of the recording sheet supply roll during activation of said marking means.

10. The data recording instrument of claim 9 in which the take-up roll includes a ratchet wheel circumjacently affixed to the axis of the take-up roll, said other arm of said lever including a drive pawl engaging said ratchet wheel, and an idler pawl engaging said ratchet wheel to prevent turning of the take-up roll in one direction.

* * * * *